United States Patent [19]

Levinson

[11] 4,301,499
[45] Nov. 17, 1981

[54] INVERTER CIRCUIT WITH CURRENT EQUALIZATION

[75] Inventor: Samuel Levinson, Norwalk, Conn.

[73] Assignee: The United States of America as represented by the Secretary of the Army, Washington, D.C.

[21] Appl. No.: 159,407

[22] Filed: Jun. 13, 1980

[51] Int. Cl.³ .............................................. H02P 13/22
[52] U.S. Cl. ....................................... 363/26; 363/97; 363/101
[58] Field of Search ................................... 363/23–26, 363/56, 97, 101, 133

[56] References Cited

U.S. PATENT DOCUMENTS

| | | | |
|---|---|---|---|
| 3,302,096 | 1/1967 | Hart | 363/133 |
| 3,846,691 | 11/1974 | Higgins | 363/25 |
| 3,859,583 | 1/1975 | Reed | 363/26 |
| 3,870,943 | 3/1975 | Weischedel | 363/26 |
| 3,938,024 | 2/1976 | Clarke | 363/23 |
| 4,190,883 | 2/1980 | Cowett | 363/97 |

Primary Examiner—William H. Beha, Jr.
Attorney, Agent, or Firm—Nathan Edelberg; Jeremiah G. Murray; Michael C. Sachs

[57] ABSTRACT

The unbalance in currents flowing alternately in the two halves of a double-ended, push-pull inverter is obviated by means of a parallel resonant network, comprised of an inductor and capacitor, placed in series with the power supply voltage applied to the center tap of the inverter transformer primary winding. The network component values are selected to provide relatively a high impedance of the inverter fundamental operating frequency while providing a low impedance at twice the fundamental operating frequency.

10 Claims, 3 Drawing Figures

COLLECTOR CURRENT
WAVEFORMS WITHOUT
EQUALIZATION

COLLECTOR CURRENT
WAVEFORMS WITH
EQUALIZATION

INVERTER CIRCUIT WITH CURRENT EQUALIZATION

The invention described herein may be manufactured and used by or for the Government for governmental purposes without the payment of any royalties thereon or therefor.

BACKGROUND OF THE DISCLOSURE

This invention relates to circuitry for converting a DC voltage of one magnitude to a DC voltage of another magnitude and more particularly to a transformer coupled double-ended, push-pull inverter.

Transformer coupled double-ended converter/inverter circuits are well known and in their simplest form comprise two switching devices which are alternately turned on and off periodically. These switching devices comprised of, for example, switching transistors are coupled to opposite ends of the primary winding of a power transformer whose center tap is connected to a source of DC supply potential. An oscillator circuit is utilized to drive the switching transistors at a predetermined operating frequency whereupon an AC signal is developed in the secondary winding of the transformer at twice the oscillator frequency which upon being rectified and filtered, provides a DC voltage of a desired magnitude.

One of the major problems involved in such circuitry, however, is the reduction of any unbalance in the currents flowing alternately in two halves of push-pull circuit configuration. One known means comprises matching the transistor characteristics of the alternately switched transistors or by using transistors having a sufficient signal capacity to tolerate the high currents generated by saturation of the transformer core. Other techniques have included inserting an inductor into the main current path of the switching transistors to inhibit rapid current rises due to saturation of the transformer.

It is an object of the present invention, therefore, to provide a relatively simple and inexpensive means for balancing the currents flowing through alternately conducting switching devices of a push-pull DC to DC inverter.

It is a further object of the present invention to provide a means of balancing current flow in the switching devices of a pulse width modulated double-ended DC to DC converter/inverter.

SUMMARY

In accordance with the subject invention, a parallel resonant network, consisting of an inductor and the capacitor, is coupled in series with the power supply voltage applied to the center tap of the primary winding of the power transformer utilized in a double-ended, push-pull inverter. The effect of the network is to reduce the unbalance in the respective currents flowing alternately in the two halves of the inverter upon being driven by a switching control circuit operating at a predetermined operating frequency. The parallel resonant network is designed to be resonant at the predetermined operating frequency of the switch control circuit. The relatively large impedance exhibited at parallel resonance opposes the flow of any unbalanced current components flowing through the switching transistors while presenting a relatively low impedance to balanced current components.

DESCRIPTION OF THE PREFERRED EMBODIMENTS

Figure 1:
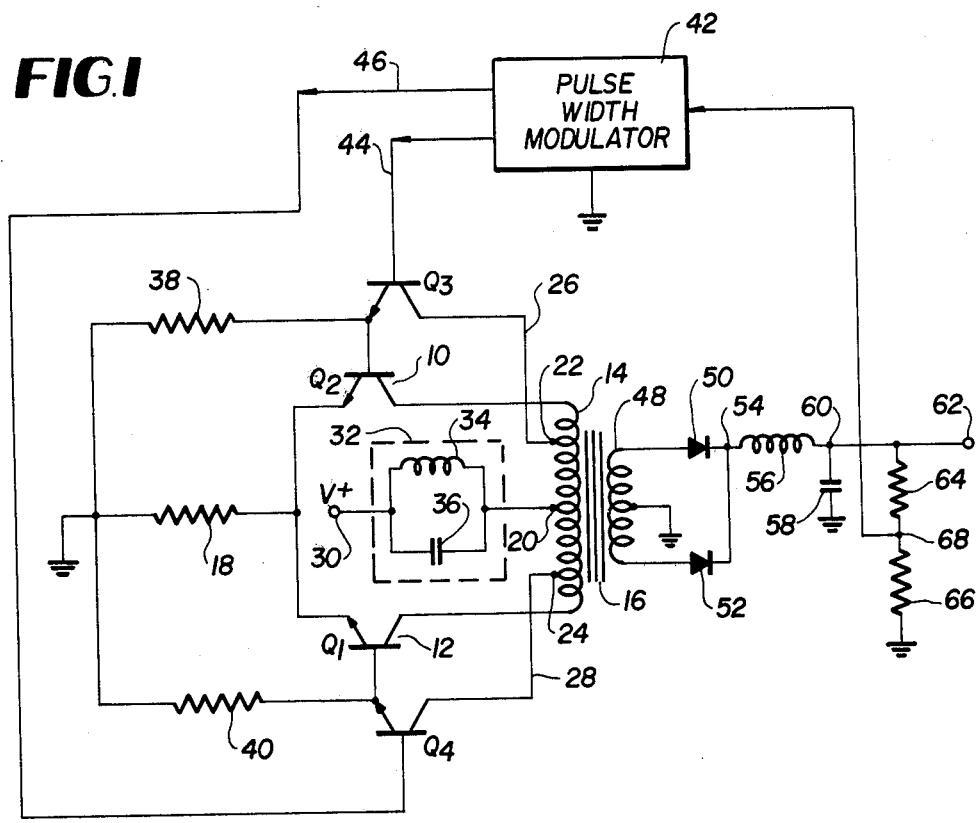
FIG. 1 is a schematic diagram of a DC to DC inverter according to the subject invention.

Referring now to the drawings, and more particularly to FIG. 1, there is disclosed a simplified DC to DC inverter controlled by pulse width modulation techniques. The circuit shown is illustrative of a double-ended, push-pull circuit configuration. As such a pair of switching devices 10 and 12 shown comprising a pair of transistors $Q_1$ and $Q_2$ are driven alternately on and off by control signals respectively applied to their base electrodes. The collectors of the transistors $Q_1$ and $Q_2$ are connected to the opposite ends of the primary winding 14 of a power transformer 16. The emitters of transistors $Q_1$ and $Q_2$ are connected to a point of reference potential illustrated as ground by means of a resistor 18. The primary winding 14 includes a center tap 20 for the application of a DC power supply potential which is adapted to power not only the transistors $Q_1$ and $Q_2$ but also a pair of drive transistors $Q_3$ and $Q_4$ whose collectors are connected to the primary winding taps 22 and 24 via leads 26 and 28, respectively. The DC power supply potential V+ is coupled to circuit terminal 30 and is applied to the center tap 20 by means of a parallel resonant network 32 consisting of an inductor 34 and a capacitor 36. It is this network to which the subject invention is directed. It will be considered further as the following description continues.

The emitters of the drive transistors $Q_3$ and $Q_4$ are connected to ground by means of the resistors 38 and 40 and the signal voltages developed thereacross due to the conductivity of the transistors $Q_3$ and $Q_4$ are directly coupled to the base electrodes of transistors $Q_1$ and $Q_2$. A pulse width modulator 42 including an oscillator, not shown, operating at a predetermined fundamental frequency applies square wave signals of mutually opposite polarity on signal leads 44 and 46 which in turn are coupled to the base electrodes of the drive transistors $Q_3$ and $Q_4$. The pulse width modulator 42 and the transistors $Q_3$ and $Q_4$ thus operate to render the transistors $Q_1$ and $Q_2$ alternately conducting and non conducting for substantially equal time periods or intervals during each cycle causing current pulses at twice the oscillator frequency to produce an AC waveform in the center tapped secondary winding 48. A pair of diode rectifiers 50 and 52 are coupled from the end terminals of the secondary winding 48 to a common circuit junction 54 to which is connected a filter circuit consisting of an inductor 56 and a capacitor 58. A common connection 60 between the inductor and capacitor is coupled to a DC output terminal 62 which is adapted to provide the required DC output voltage. The operation of the pulse width modulator 42 is further controlled in a well known manner in accordance with a feedback signal developed by a series voltage divider network consisting of the resistors 64 and 66 connected between the output terminal 62 and ground. The feedback voltage is coupled from the common circuit connection 68 intermediate the resistors 64 and 66.

As noted above, the inventive concept of the subject invention exists in the inclusion of the parallel resonant network 32 which is coupled in series between the power supply terminal 30 and the primary center tap 20. The component values of the inductor 34 and the capacitor 36 are chosen such that parallel resonance exists at the inverter fundamental frequency which corresponds to the operating frequency of the pulse width modulator 42. Under such conditions, due to the inherent characteristic of a parallel resonant network, a relatively high impedance exists between terminal 30 and the center tap 20 for a frequency substantially equal to the inverter fundamental frequency while exhibiting a low impedance for a frequency at twice the inverter frequency.

Figure 2:
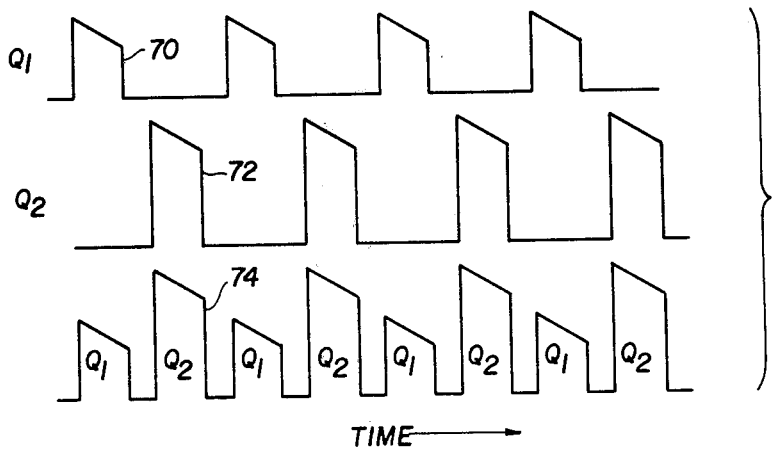
FIG. 2 is a set of collector-emitter current waveforms illustrative of the operation of the circuit shown in FIG. 1 without current equalization which is provided by the subject invention.
Figure 3:
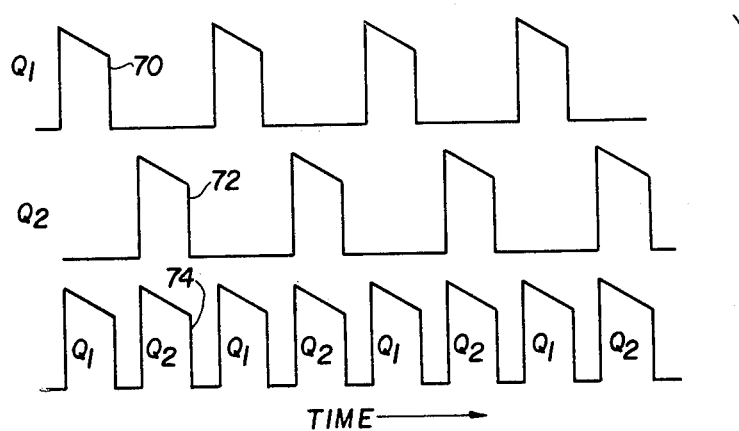
FIG. 3 is a set of collector-emitter current waveforms illustrative of the current equalization which results from the utilization of the subject invention.

In operation, when the current flow is equally balanced between the two transistors $Q_1$ and $Q_2$, the current flows in pulses in the primary winding 14 at twice the inverter frequency. As such, the waveform of the collector-emitter currents contains only second harmonic and higher even order harmonics of the inverter frequency. An unbalance condition, however, effects a resultant current flow at the inverter's fundamental frequency. This latter condition is evident when one considers the waveforms depicted in FIG. 2. Waveform 70 denotes the collector-emitter current waveforms of transistor $Q_1$ while waveform 72 denotes the corresponding current waveform for the transistor $Q_2$ of FIG. 1. The waveform 74 is illustrative of the composite waveform of both transistors which could be observed, for example, by noting the voltage developed across resistor 18 shown in FIG. 1. It is evident that under the unbalanced conditions which are shown in FIG. 2, the current flow existing in transistor $Q_2$ exceeds that of transistor $Q_1$. Such a condition can exist in absence of the parallel resonant network 32. The inclusion of the network 32 as shown in FIG. 1 between points 20 and 30, however, opposes the flow of current at the inverter fundamental frequency while generating a voltage at the fundamental frequency which alternately adds to or subtracts from the DC inverter supply potential V+ applied to circuit terminal 30. The resultant effect of the tuned circuit 32 is that a voltage boost will occur on the low side current flow while a reduction will occur on the high side voltage current flow, resulting in a set of current waveforms such as shown in FIG. 3, wherein the composite waveform 74 is comprised of component waveforms 70 and 72 of substantially equal amplitude which is indicative of substantially equal currents flowing alternately in the two halves of the push-pull inverter of FIG. 1.

Thus what has been shown and described is a transformer coupled double-ended inverter circuit which includes a relatively simple yet highly effective means for balancing the current flow between two switching devices which are alternately and periodically turned on and off to thereby couple a DC energy source to opposite terminals of a primary winding of a power transformer which in turn causes an AC square wave signal to be induced in the secondary winding thereof.

While there has been shown and described what is at present considered to be the preferred embodiment of the present invention, it is done by way of illustration only. It is not desired, therefore, that the invention be limited to the specific arrangements shown and described, but it is intended to cover all such modifications as fall within the spirit and scope of the invention as defined in the appended claims.

What is claimed is:

1. Circuit means for equalizing the respective currents flowing alternately in two halves of a double-ended, push-pull DC to DC inverter, comprising in combination:
   an inverter transformer having a primary winding including a center tap and a secondary winding;
   means for receiving a DC supply potential;
   a pair of switching devices respectively coupled to opposite ends of said primary winding;
   control circuit means generating periodic signals of a predetermined fundamental operating frequency coupled to said switching devices for rendering said devices alternately conducting and non conducting in a mutually opposite sense; and
   a parallel resonant network coupled between said center tap of the primary winding and said means for receiving the DC supply potential, said resonant network having a resonant frequency substantially equal to said fundamental operating frequency and being operable thereby to produce balanced currents in said pair of switching devices and accordingly the primary winding of said inverter transformer.

2. The circuit means as defined by claim 1 wherein said parallel resonant network consists of at least one inductor and at least one capacitor.

3. The circuit means as defined by claim 2 wherein the component values of said inductor and capacitor are selected such that the impedance level at parallel resonance is relatively high in comparison to the impedance level at twice said fundamental operating frequency.

4. The circuit means as defined by claim 1 wherein said switching devices are comprised of first and second semiconductor switch devices.

5. The circuit means as defined by claim 4 wherein said first and second semiconductor switch devices are comprised of like transistors.

6. The circuit means as defined by claim 1 wherein said control circuit means comprises a pulse width modulator circuit, and additionally including circuit means coupled to said secondary winding for providing a feedback signal to said pulse width modulator circuit.

7. The circuit means as defined by claim 6 and additionally including respective driver circuit means coupled between said pulse width modulator circuit and said pair of switching devices for coupling said periodic signals thereto, said driver circuit means being coupled to said primary winding for being powered from said DC supply potential.

8. The circuit means as defined by claim 7 wherein said driver circuit means and said switching devices are comprised of transistors.

9. The circuit means as defined by claim 1 and additionally including circuit means coupled to said secondary winding for providing a DC output signal from said output currents generated in said secondary winding.

10. The circuit means as defined by claim 1 wherein said control circuit means includes means for rendering said switching devices alternately conducting and non conducting for substantially equal time periods.

* * * * *